United States Patent Office 2,760,991
Patented Aug. 28, 1956

2,760,991

PRODUCTION OF PHENOLS

William G. Toland, Jr., San Rafael, Calif., assignor to California Research Corporation, San Francisco, Calif., a corporation of Delaware No Drawing. Application August 10, 1953, Serial No. 373,448

4 Claims. (Cl. 260—621)

This invention relates to a process for producing phenols. More particularly, it relates to a process in which phenols are produced by direct oxidation of aromatic hydrocarbons. This application is a continuation-in-part of my copending application Serial No. 290,069, filed May 26, 1952, now abandoned.

It has been found that phenols can be produced by bringing an aromatic hydrocarbon having at least one unsubstituted nuclear hydrogen atom, a copper compound and water into contact at temperatures above about 350° F.

The process of the invention is illustrated by the following examples in which phenols are produced by direct oxidation of aromatic hydrocarbons having at least one unsubstituted nuclear hydrogen atom.

Example 1

780 g. of benzene, 500 g. of copper sulfate pentahydrate and 900 cc. of water were charged to a 4.5 liter stainless steel autoclave. The autoclave was sealed and heated to 625° F. The heating was continued with constant shaking for a period of 2 hours. The pressure in the autoclave was the autogenous pressure built up by the heating of water and benzene in the closed autoclave. The autoclave was cooled and opened. The reaction product mixture was filtered and 108.9 g. of elemental copper were recovered as the filter cake. The filtrate was steam-stripped and filtered again. A very small amount of tar was recovered as the filter cake in the second filtration. The second filtrate was distilled with steam to recover an overhead organic layer, an overhead aqueous layer and a bottoms aqueous layer. Phenol was present in each of the layers and was recovered from them. A total of 0.54 mole of phenol was recovered.

Example 2

The procedure of Example 1 was repeated, substituting toluene for benzene. The reaction product was a mixture of unreacted toluene, cresols and tar. Cresol yields based on toluene converted were low in this run, being on the order of 12% of theory.

Example 3

The procedure of Example 1 was repeated, substituting para-xylene for benzene. 2,5-xylenol was recovered from the reaction product. The yield was approximately 30% of theory.

Example 4

The procedure of Example 1 was repeated, substituting t-butylbenzene for benzene. Meta-t-butylphenol was recovered from the reaction product. The yield was approximately 20% of theory.

Example 5

The procedure of Example 1 was repeated, substituting naphthalene for benzene. β-naphthol was recovered from the reaction product.

Copper compounds either cuprous or cupric, in general, are operative in the process and may be substituted for the copper sulfate used in the reaction illustrated, but the sulfates are preferred. Inorganic water-soluble copper salts whether cuprous or cupric behave as does the copper sulfate. Copper salts of organic acids are less desirable because of the tendency of the organic radical to undergo side reactions under the process conditions such as decarboxylation. Insoluble copper compounds are also operable in the process. For example, phenol is produced by heating benzene with water and copper phosphate.

In addition to the reactions shown in detail in the examples, it has been found that alkyl aromatic hydrocarbons can be oxidized to phenols pursuant to the invention provided that the aromatic nucleus contains at least one unsubstituted nuclear hydrogen atom. The size of the alkyl groups substituted on the aromatic nucleus does not appear to affect the nature of the reaction, but reaction rate is decreased if the alkyl groups are large. Thus, alkyl groups containing from 1 to 18 carbon atoms remain intact on the nucleus, while a nuclear hydrogen atom is replaced by a hydroxyl group pursuant to the invention.

The oxidation may be conducted batchwise under conditions to maintain a part of the water in liquid phase as illustrated in the examples above. The process can also be conducted continuously by passing benzene and water vapors through a fixed bed or fluidized bed of the copper compound. The oxidation can also be conducted continuously with a part of the water in liquid phase by passing a mixture of benzene, water, and a water-soluble copper compound through a long tubular reactor maintained under a superatmospheric pressure sufficient to hold a part of the water in liquid phase.

An elevated temperature above about 350° F. is necessary for the reaction. It is preferred to conduct the reaction at temperatures in the range from 350 to 700° F. and, more desirably, in the range from 500 to 675° F. At higher temperatures increasing amounts of the phenolic compounds produced will undergo further reactions.

It is desirable to employ a relatively large quantity of water in the reaction. It is preferred to employ at least 10 moles of water per mole of hydrocarbon charged to the reaction zone, and higher mole ratios of water to hydrocarbon, for example, 35:1, 60:1 and 110:1, have been employed successfully. Yields of phenolic products based on hydrocarbon converted increase when higher mole ratios of water to hydrocarbon are employed. It is preferred to employ from 25 to 75 moles of water per mole of hydrocarbon in the reaction.

It is preferred to operate the process taking low conversions per pass, separating the phenolic product from the unconverted hydrocarbon and returning the hydrocarbon to the reaction zone. In this manner overoxidation of the phenolic product is avoided and higher yields are obtained.

It is desirable to employ solvents in the reaction in some cases, especially when higher molecular weight hydrocarbons are subjected to the oxidation. Lower molecular weight paraffinic hydrocarbons are suitable for use as solvents.

Elemental copper formed during the reaction can be dispersed in the aqueous portion of the reaction product after phenol has been removed and oxidized to a copper compound useful in oxidizing further quantities of hydrocarbon by blowing the suspension with air. When the copper is reoxidized in this manner the only materials ultimately consumed during the production of the phenolic compounds are the hydrocarbon feed and air.

I claim:

1. A process for producing phenols which comprises heating benzene with water and copper sulfate to a temperature above about 350° F. under a superatmospheric pressure sufficient to maintain a part of the water in liquid phase.

2. A process for producing phenols which comprises heating benzene with copper sulfate and water to a temperature in the range from 500 to 700° F. under a superatmospheric pressure sufficient to maintain a part of the water in liquid phase.

3. A process for producing phenols which comprises heating an aromatic hydrocarbon having at least one unsubstituted nuclear hydrogen atom with copper sulfate and water to a temperature above about 350° F. under a superatmospheric pressure sufficient to maintain a part of the water in liquid phase.

4. A process for producing phenols which comprises heating an aromatic hydrocarbon having at least one unsubstituted nuclear hydrogen atom with copper sulfate and water to a temperature in the range from about 500 to 700° F. under a superatmospheric pressure sufficient to maintain a part of the water in liquid phase.

References Cited in the file of this patent

UNITED STATES PATENTS 2,662,923     Reeder _____ Dec. 15, 1953